United States Patent [19]
Michelson et al.

[11] Patent Number: 5,319,509
[45] Date of Patent: * Jun. 7, 1994

[54] METHOD AND APPARATUS FOR CONTROLLING AND ANALYZING A DATA STORAGE SYSTEM

[75] Inventors: Gajus Michelson, Westlake Village; William W. Valliant, Camarillo; Martyn A. Lewis, Pacific Palisades, all of Calif.

[73] Assignee: Servo Track Writer Corporation, Westlake Village, Calif.

[*] Notice: The portion of the term of this patent subsequent to Dec. 7, 2010 has been disclaimed.

[21] Appl. No.: 759,402

[22] Filed: Sep. 13, 1991

Related U.S. Application Data

[63] Continuation-in-part of Ser. No. 596,489, Oct. 12, 1990, Pat. No. 5,268,801.

[51] Int. Cl.$^5$ ............................ G11B 5/596; G11B 33/10
[52] U.S. Cl. ...................................... 360/77.03; 360/55; 360/137; 360/72.1
[58] Field of Search ............... 360/72.1, 77.03, 97.01, 360/137, 55, 77.04

[56] References Cited

U.S. PATENT DOCUMENTS

| | | | |
|---|---|---|---|
| 3,812,533 | 5/1974 | Kimura et al. | 360/77.08 |
| 3,875,589 | 4/1975 | Applequist et al. | 360/78.12 |
| 4,068,268 | 1/1978 | Idemoto et al. | 360/78.04 |
| 4,371,902 | 2/1983 | Baxter et al. | 360/75 |
| 4,414,589 | 11/1983 | Oliver et al. | 360/77.07 |
| 4,531,167 | 7/1985 | Berger | 360/77.02 |
| 4,556,964 | 12/1985 | Trethewey | |
| 4,644,416 | 2/1987 | Yamada | 360/17 |
| 4,701,818 | 10/1987 | Gitzendanner | 360/106 |
| 4,831,470 | 5/1989 | Brunnett et al. | 360/75 |
| 4,920,442 | 4/1990 | Dimmick | 360/137 |
| 4,980,783 | 12/1990 | Moir et al. | 360/77.02 |

FOREIGN PATENT DOCUMENTS

| | | |
|---|---|---|
| 0202480 | 11/1986 | European Pat. Off. |
| 0259039 | 3/1988 | European Pat. Off. |
| 2133449 | 8/1983 | United Kingdom |

OTHER PUBLICATIONS

"Quad-Burst RES System for Disk File Servo", W. A. Herrington and F. E. Mueller, *IBM TECH. Disc. Bulletin*, vol. 21, No. 2, Jul. 1978.
Patent Abstracts of Japan, vol. 11, No. 49, P547, abstract of JP 61-2124285, publ. Sep. 24, 1986 (Tobisha Corp.).

*Primary Examiner*—David L. Robertson
*Attorney, Agent, or Firm*—Merchant, Gould, Smith, Edell, Welter & Schmidt

[57] ABSTRACT

A system and method for controlling and analyzing data storage systems, and more particularly, to systems and methods for controlling and analyzing performance and physical attributes of a sealed disk drive unit using an externally accessible but internally integral positioning system. A disk drive having a sealed housing utilizes a reflective planar mirror on the rotary actuator controlling the head drive assembly. A narrow beam directed through a window on the side wall of the housing onto the mirror is reflected off at angle dependent on the actuator position to a beam sensitive detector. A translator system driven by a positioner disposed at a distance from the rotary actuator axis which is substantially greater than the distance between the actuator axis and the head assembly, is used to vary the relationship between the directed and reflected beams. This system incorporates the rotary actuator in a closed loop servo that positions the actuator precisely at different locations relative to the recording medium, so that the data may be written and analyzed at off-track track position increments. The invention further provides, at an early or later manufacturing stage, means for calculating bias torque and friction without the need for prerecorded embedded servo information.

14 Claims, 8 Drawing Sheets

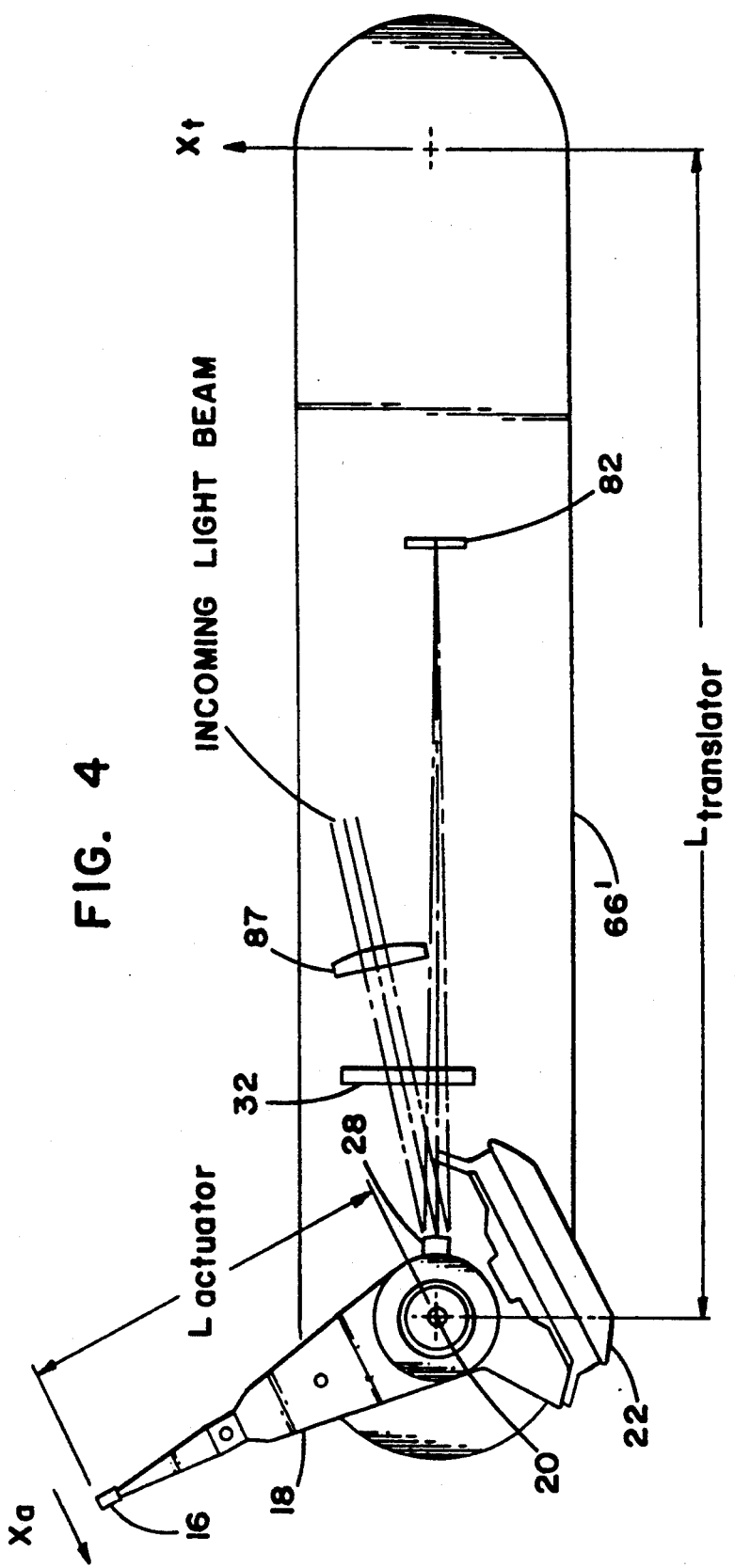

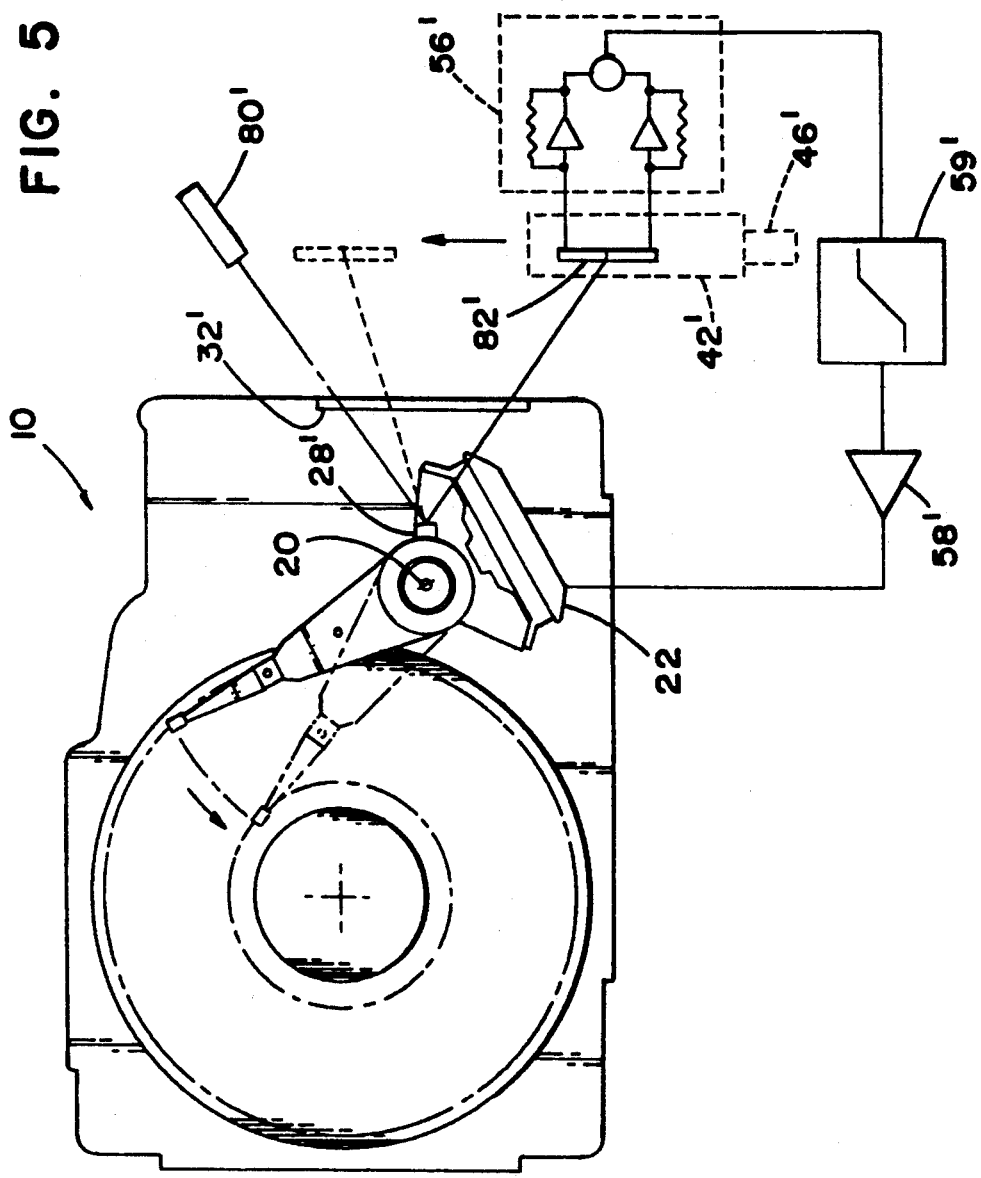

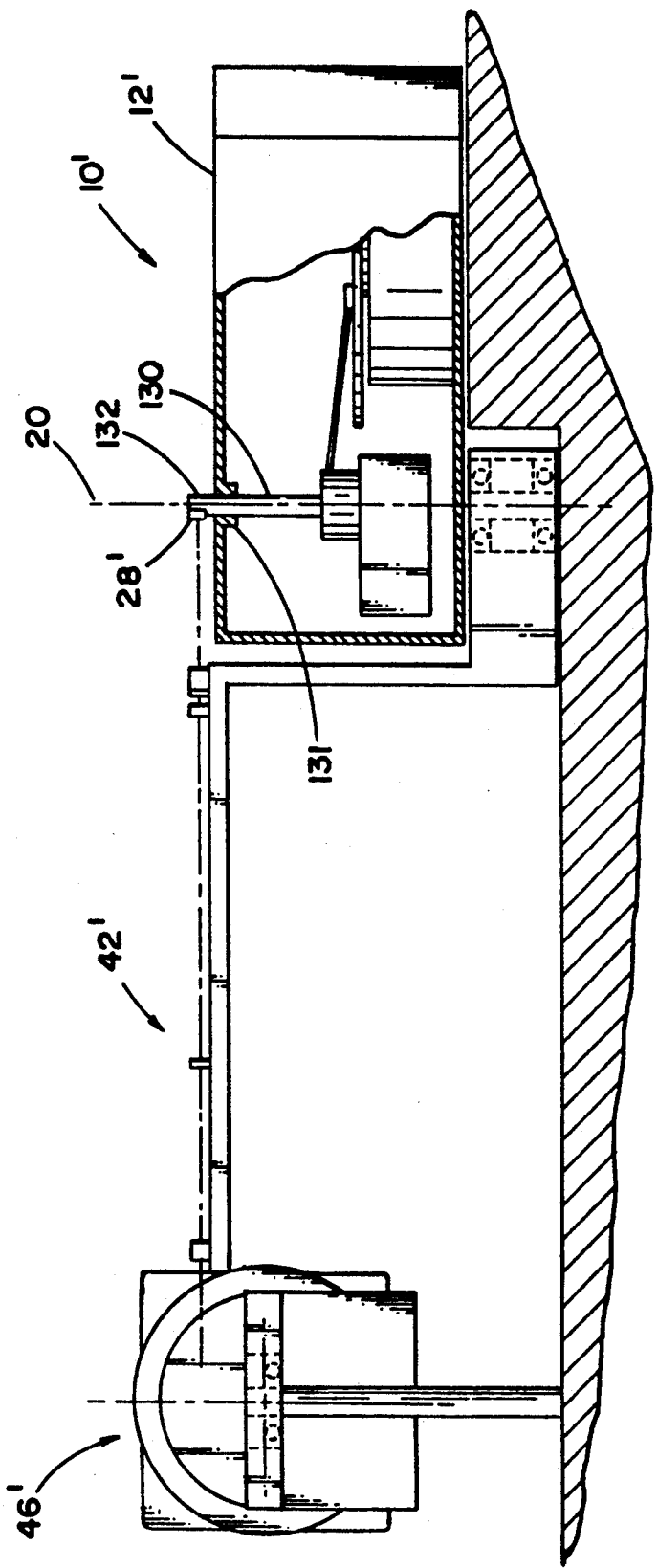

METHOD AND APPARATUS FOR CONTROLLING AND ANALYZING A DATA STORAGE SYSTEM

CROSS-REFERENCE TO RELATED APPLICATIONS

This application is a continuation-in-part of application Ser. No. 07/596,489, filed Oct. 12, 1990, now U.S. Pat. No. 5,268,801, by R. L. Hazel et al., and entitled "METHOD AND APPARATUS FOR EFFECTING DATA TRANSFER WITH HIGH PRECISION REFERENCE DATA ON A ROTATABLE STORAGE MEDIA," which application is incorporated by reference herein.

BACKGROUND OF THE INVENTION

This invention relates to systems and methods for controlling and analyzing data storage systems, and more particularly, to systems and methods for controlling and analyzing performance and physical attributes of sealed disk drive units using an externally accessible but internally integral positioning system.

In the present state of the art pertaining to digital storage on movable media, extremely high track densities (of the order of 1000–2000 tracks per inch) have become feasible. Workers in the art have constantly sought to increase the number of usable tracks per disk, i.e. the track density, since it is intuitively recognizable that doubling the number of tracks per inch effectively doubles the amount of stored data. As track densities were increased, it was soon found that open loop systems, such as incremental positioning systems without actual head position feedback, could not meet the accuracy requirements. Such previously minor factors as thermal errors and manufacturing tolerances could not be accepted because of the very small track spacings. Consequently, developers went to embedded servo track systems, and sophisticated dedicated servo surface systems which may also be combined with some embedded servo track information. Embedded servo track systems have prewritten reference patterns within the data tracks which enable precise location of magnetic heads for writing and reading during operation. Dedicated servo surface systems have a single disk surface on which there is only recorded head position information. This information is continuously read in order to position the remaining read/write heads mounted on the common actuator. The constant quest for ever higher track densities has led to modern systems which have 2,000 to 4,000 or more tracks per inch, for magnetic media.

Some of the techniques heretofore used have written the required reference patterns by accurately positioning the head assembly by a separate apparatus which is typically not part of the final drive assembly. For example, an external rotary or linear actuator may be attached to the head assembly drive actuator. With the position of the external actuator being accurately controlled, the head assembly actuator correspondingly follows. This, however, can result in positioning inaccuracies due to various factors such as the friction in the coupling between the two actuators, the relative position of the external actuator and the servo head, and errors between the external position and actual internal head position.

A substantially more costly technique, but one which may be adequately precise, mounts a retroreflector assembly on the head assembly actuator, and directs reflected light to a fixed laser interferometer, which can give an extremely precise position signal for the head actuator in the form of a distance measurement to the retroreflector. Then, an external actuator can be used to position the head drive, or the drive's head actuator can be placed in a servo loop which uses the interferometer for position feedback. This expedient is, however, expensive and as usually practiced, involves an incompletely assembled drive, and clean room operation.

A serious disadvantage is the fact that the disk drive unit must be in an incomplete stage of assembly in order to obtain access to the head assembly actuator, and thereafter maintained in a clean room for the servo track writing operation. A clean room is required to provide the equivalent environment of a clean sealed disk drive assembly. A purified atmosphere without particulate contaminants is needed to "fly" the magnetic head assembly at the necessary close spacing (of the order of a few microinches) to the surface of the disk. Otherwise, particulates, such as ordinary dust, appear as relatively massive objects that affect both the head dynamics and recording.

It is evident, therefore, that none of the available expedients provides a suitably low cost, high precision, method for positioning and writing position reference information on a disk storage medium, or particularly for doing so with a sealed type of drive and under conditions and with procedures suitable for mass production operations.

There are circumstances in which it is desired to sense or control a part of the dynamic interior mechanisms of an open or a sealed disk drive, in terms of determining where the head mechanism is, or the angular position of the disk itself, or both. In preparatory testing of a newly assembled disk drive unit, it may be desirable to analyze the quality of the write/read circuitry and the media consistency without the need or use of servo tracks. For example, testing data amplitude, modulation or pulse width at a varying radii along the rotatable medium can identify defects in the recording medium and or a malfunctioning write/read head. Without a full operating system and servo information, this cannot redily be readily accomplished, if at all, by present techniques.

As a different example, it may be desirable to establish off-track or cross-track performance. To accomplish this, a track of data can be written and subsequently read from positions which are at small increments located increasing further away from the track location, wherein the increments are much smaller than the standard prescribed distance separating two concentric tracks of data.

Likewise, the head assembly can be positioned so as to write first and second tracks of data separated by a predetermined distance. The first or second track of data can then be read at small increments in the gap therebetween, moving from one track towards the other, so as to ascertain the cross-track interference between the first and second tracks. With present techniques utilizing servo information, this cannot readily be accomplished without a fully functioning system.

Yet still another advantage is the ability to determine the magnitude of any unwanted bias torques acting upon the rotary actuator as well as the magnitude of system friction without having a fully operating system. Again, present positioning techniques do not lend themselves to such measurements.

SUMMARY OF THE INVENTION

Systems and methods in accordance with the invention for analyzing attributes of a drive assembly within a sealed disk drive unit employ a precision mechanical translator and a light beam reflected off a member associated with or on the media, such as part of a head drive assembly, for accurately detecting the radial position of the head drive assembly. The reflected beam is directed as a small area beam spot onto a precision detector associated with the translator. The geometry is arranged such that increments of movement of the translator can be substantially greater than increments of movement of the head drive assembly. By precisely locating the translator at different positions and using an error signal derived from the detector, the head assembly can be precisely positioned without the need for pre-existing servo information. The positioning scheme provides the ability to control internal position in response to an external position command, thereby allowing evaluation of drive attributes both before and after final assembly. Included in these evaluations are measurements of media performance at varying radii, as well as measurements of bias forces (torques) and friction within the system. For example, data can be written, read and analyzed for quality without the use or need of the usual position information.

Important aspects of the invention derive from the multiplication factor obtained through use of the translator that moves through the same angle but substantially larger displacements due to the geometry than does the head drive actuator, together with minute beam cross section size, so that the position can be precisely sensed, as by a bicell detector. Very small changes in position at the translator thus generate relatively large and precise error signals to maintain a tight closed-loop system. In combination with other known information such as the torque constant and inertia of the actuator driver, the precise position system can be used to measure performance criteria and to calculate other physical attributes within the system. In a preferred arrangement, the beam is focused at an image region, and the centroid of the beam, whose area is less than the area of the detector, generates signals used in a differential manner to derive the error signal. The error signal is zero when the centroid is on the index line, (weighted by the relative intensities of each half of the bicell), between the halves of the bicell and varies in a positive or negative sense dependent on the deviation from the index.

This arrangement is particularly advantageously used with a sealed magnetic disk drive having a rotary actuator for a magnetic head structure. The disk drive incorporates, at minimal additional cost, a window and a small planar mirror positioned on the actuator. The mirror may be implemented as an adequate flat area on the actuator structure. The light beam, such as a laser beam, is directed through the window to be reflected off the actuator onto the detector, which is movable on the translator mechanism along an arc centered on the axis of the rotary actuator. A sealed disk drive unit may therefore be mounted in position relative to the translator and the rotary actuator commanded by the servo system to a desired position, wherein the signal from the detector representing the position of the head drive assembly is fed back as the actual position, thereby closing the servo loop. The system can then precisely read and write data tracks without the need of pre-written servo tracks and without the need to disassemble the sealed disk drive.

It is particularly advantageous to use the light beam in an autocollimator configuration, such that the light source is disposed on the translator to form a beam along a parallel path with reflected beam to the detector, with beam splitters being utilized to guide the returned beam back to the detector. In this system, a pair of transimpedance amplifiers are coupled to the different parts of the bicell, and their signals are combined together with the command position signal to generate the error signal which drives the rotary actuator. For convenience of control, the combined signal from the bicell is normalized to compensate for laser beam intensity variations. In addition, a part of the laser beam is split off and directed toward a fixed reference detector to be used in generating a reference signal, also normalized, in compensating for beam pointing variations.

Another aspect of the invention is a sealed disk drive having a rotary actuator and characterized by a planar reflector mounted on the actuator to be pivoted in response to movement of the translator, and a light transmissive window spanning an arc that encompasses all angles of a line perpendicular to the mirror as it changes angle with the actuator between its limits of motion.

Further, in accordance with the invention, the translator and detector system may be used to write position information with a data storage system that has an external rotary actuator shaft. In this instance the mirror may be removably or permanently mounted on the accessible portion of the shaft, and no window is needed.

A further feature of the invention lies in the combination of internal reflective indicia, one or more transmissive windows in the sealed housing, and the external beam generation and reflected beam sensing system to sense the operating position of internal dynamic mechanisms. The angular position of a disk can thus be sensed by providing peripheral index marks, the passage of which are remotely detected during rotation to generate control information for positioning, clocking or sector identifying purposes.

Yet still another feature of the invention includes utilizing the positioning system information in analyzing the various attributes of the drive assembly including magnetic head and disk performance at varying radii on the disk. Further, read/write performance such as data degradation as a function of offtrack positioning of the read head or interference caused between concentric tracks may be analyzed using the positioning mechanism to position the head drive assembly.

An additional features is that undesirable aspects which vary from unit-to-unit, such as bias torques and friction, may be determined by measuring the motor current and knowing the torque vs. current relationship for the actuator motor and utilizing the high bandwidth positioning system to insure acceptable values.

BRIEF DESCRIPTION OF THE DRAWINGS

A better understanding of the invention may be had by reference to the following description, taken in conjunction with the accompanying drawings, in which:

FIG. 4 depicts more specific details of a beam focusing path, slightly modified for clarity, that may be utilized in the arrangement of FIGS. 2 and 3;

FIG. 5 is a different example of a different form of reference pattern writing system in accordance with the invention;

FIG. 6 is a perspective and generalized view of essential features of a system for controlling the writing of position information in a disk drive that has an externally accessible shaft for actuator control;

DETAILED DESCRIPTION OF THE INVENTION

Figure 1:
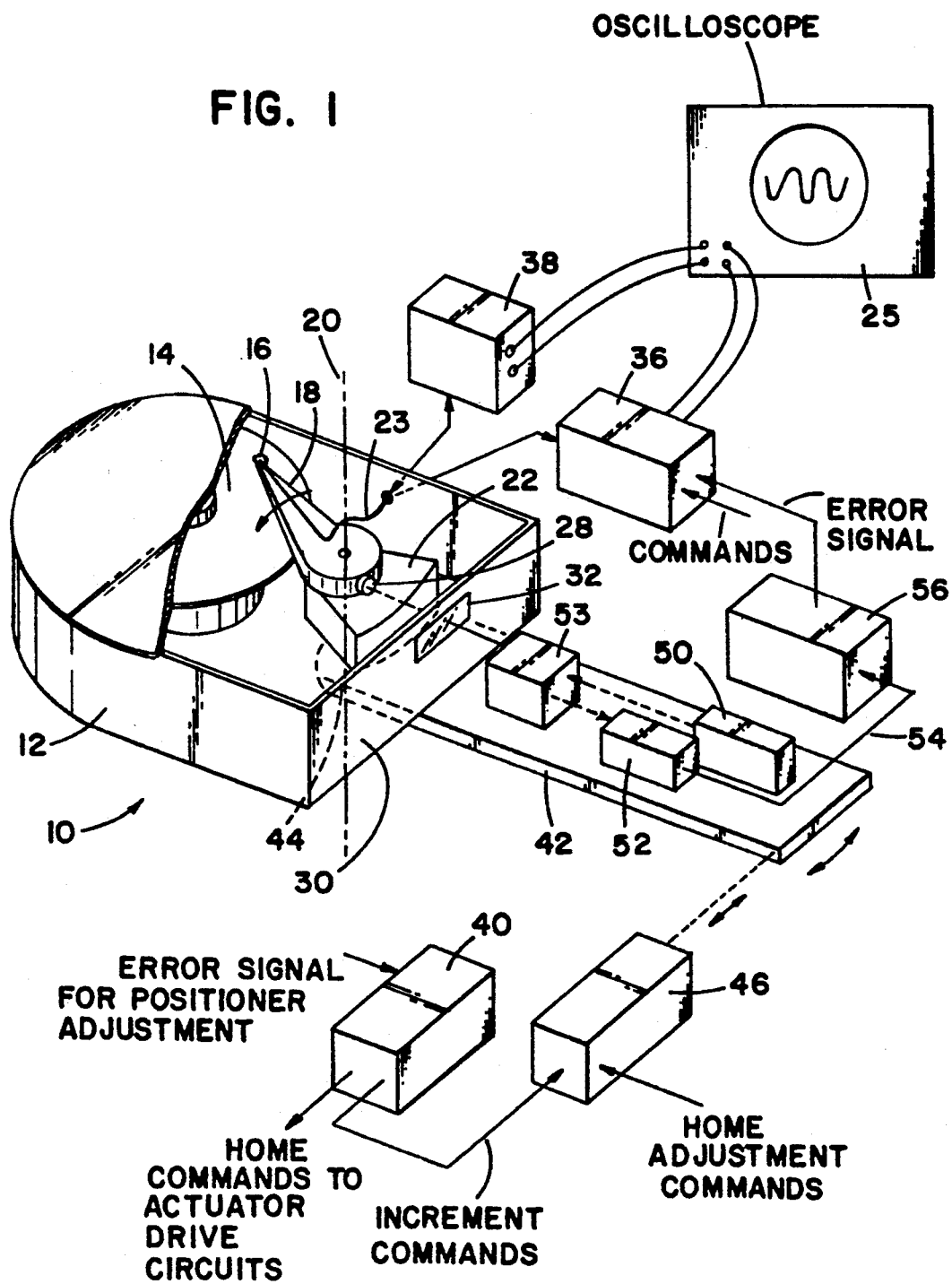
FIG. 1 is a combined perspective and block diagram view of a system in accordance with the invention.

An example of a control and analyzing system in accordance with the invention is shown in generalized form in FIG. 1. Further details of a specific preferred version are shown, without duplication of some of the associated circuits and devices, in FIGS. 2 to 4. The examples given relate to a high density magnetic disk drive 10 of the design having a sealed housing 12 with air filtration means (not shown) for ensuring that particulates cannot intrude between the disk 14 and the closely spaced, hydrodynamically supported, magnetic head 16. The head 16 is mounted on an actuator arm 18 that is pivoted about an actuator axis 20 by a drive actuator 22, such as a DC motor, a voice coil motor, a torque motor, or some other precision angular positioner.

Electrical connections are provided to head 16 with a flexible cable 23. Flexible cable 23 has a first end attached to the head 16 through a printed circuit connection spanning the arm 18 and a second end strain relieved and attached to the stationary housing 12. Cable 23 permits actuator arm 18 to pivot about axis 20 while maintaining electrical connections between the head 16, actuator drive 22, stationary read/write circuits 38, and actuator drive circuits 36, respectively.

These elements and relationships are not shown in detail because they, as well as the drive spindles and motors, are well known in the art. Variants such as multiple disk assemblies should also be understood to be adaptable to use within the scope of the invention. The present specific example is directed to a 5¼" diameter disk system, but adjustment for smaller (e.g. 3½", 2½" and sub-2") and larger (e.g. 8", 9½" and 14") disk systems will be understood to require no more than routine engineering effort.

The principles and embodiments of the invention also apply to optoelectronic disk memories, where these are to be used without prewritten or pre-embedded reference patterns. Most current optoelectronic memories incorporate physical reference patterns, but as new electrooptic media come into use this approach may not always be feasible or desirable.

The actuator arm 18 serves as the base for receiving a small planar mirror 28, mounted on the side of the base portion of the arm 18 so as to be approximately tangential to a circumference about the actuator axis 20, at a short radius from that axis. Also, the disk drive 10 is further modified by incorporation, in one wall 30 of the housing 12, of a small transparent window 32. The window 32 spans the arc which a line perpendicular to the plane of the mirror 28 traverses between the limits of movement of the actuator arm 18 as it moves between the innermost and outermost (or vice versa) tracks on the disk 14. The window 32 is joined to the sealed housing 12 so as to maintain the internally clean environment, and sealants or gaskets may be used to ensure against leakage if desired. Although the window 32 may be curved about the actuator axis 20, it is shown below that a planar window 32 does not introduce an unacceptable level of error, and thus a flat element is preferred for cost reasons. In any event the mirror 28 and window 32 add only a minimal increment of cost to the disk drive 10, and constitute the only modifications to the drive mechanical configuration. The mirror 28 is attached as an integral port of the actuator arm 18 so as to bisect the axis 20 (if on the axis) or, more usually, on the side of the arm 18 tangential to a circumference about the axis 20. The window 32 spans an arc that encompasses a beam path perpendicular to the plane of the mirror 28 as the actuator 18 moves through its range of travel.

To the disk drive 10 can be added an actuator drive circuit 36 which operates in response to external commands and to internal servo information to move the actuator. The resident drive circuits of the disk drive 10 can be used but this is not preferred if they are not designed to accommodate the external error signal requirements. The drive 10 also incorporates means for defining a known track position, such as a "home" track position at one limit of the recording area. Read/write circuits 38 may incorporate internal means for writing and reading timing information and/or servo pattern signals that are to be applied from an external signal generation source (not shown). Further details are not given because timing signals are not used with all reference patterns, because a dedicated clock head can be used, and because various other expedients are available for writing timing data and servo patterns. These include the use of peripheral index marks, independently sensed through the window, on the disk in the fashion shown in FIG. 7 and described below. They also include a system which does not require the use of indicia, such as that described by Martyn Lewis in a U.S. patent application filed concurrently herewith.

The reference pattern writing system in accordance with the invention also includes control circuits 40 which provide a "home" command to the actuator drive circuits 36 for initializing operations, and increment commands for thereafter selecting successively spaced apart reference positions for a mechanical translator 42 external to the disk drive 10. The mechanical translator 42 is mounted to pivot on a translator shaft 44 approximately collinear with the actuator axis 20, so that light beam devices on the translator 42 move in a plane normal to the actuator axis at constant radii from the axis 20.

The arm length of the translator 42 (sometimes $L_{translator}$ hereafter) is at a distance from the axis 20 that is substantially greater than the arm length ($L_{actuator}$) between the axis 20 and the recording head gap on the magnetic head 16. Referring briefly to FIG. 4, this relationship is shown, although not to scale.

Referring again to FIG. 1. the circumferential arc of movement of any point on the translator 42 about the axis 20 corresponds to the arc described by a line perpendicular to the planar mirror 28. The translator 42 is shifted in position by an electromechanical positioner 46, operating in response to control circuit 40 commands. With the rotary arm 18 in the "home" position, however, the positioner 46 receives error signals so that the translator 42 may be driven to a corresponding start position from which track writing can begin. This is to say that the translator 42 is driven to "find" the beam reflected by the arm 18 in its home position. This initialization of the translator 42 is effected by the control circuits 40 in response to error signals generated as described below. The control circuits 40 may comprise a microprocessor or firmware for providing the two basic commands needed for positioner 46 operation.

Either one or both of two light beam devices, namely a light beam source 50 and a beam position detector 52, are mounted on the translator 42. When both are movable with the translator 42 the unit functions as a single plane autocollimator 54, with a projected light beam from the source 50 being reflected off the mirror on the arm 18 inside the housing 12, and the reflected beam being parallel to the projected beam when the system is adjusted to a stable position. However, in alternative configurations either the light beam source 50 or the beam position detector 52 may be fixed, with the other element 50 or 52 being mounted on and moving with the translator 42. The autocollimator version is generally preferred because it allows certain corrections to be made for higher resolution, because the length of arc is smaller by a factor of two, and the window 32 can therefore also be smaller.

The light beam source 50 can be any light source suitable for directing a small beam spot on the detector 52, but for cost and performance reasons a semiconductor laser is generally used. An optics system 53 is used to separate the direct and reflected beams and establish the desired small beam spot size at the object plane. The pattern of a laser beam spot has a generally Gaussian distribution and is elliptical in outline, but the beam centroid does not change (unless the beam direction shifts) because these factors are constant. The beam position detector 52 has an area larger than the beam spot size, and a configuration to provide a signal that varies with beam position on the detector. Thus the detector may comprise a linear array of elements, a two-dimensional array of elements, or a single device with variable amplitude response, such as a lateral cell. Preferably, however, the detector 52 comprises a bicell unit in which two adjacent detector cells abut at an intermediate index line or area which defines the desired position for the beam centroid when the rotary actuator is in stable operation at a selected position.

The signals generated by the detector 52 are converted into an error signal by error signal generating circuits 56, including typical preamplifier and signal compensation means, and coupled to the actuator drive circuits 36.

This system in accordance with the invention thus employs the translator 42 as a remote position reference for placing the magnetic head 16 at chosen radial positions, very precisely determined, relative to the disk 14. The rotary actuator arm 18 real time position is represented by the reflected light beam direction off the mirror 28, because the light beam from the source 50 in any event impinges off the mirror 28 through the window 32, and then reflects back through the window 32 onto the detector 52. Because the arm length at which translator 42 adjustments are made is substantially greater than the actuator arm length to the magnetic head 16, there is a corresponding advantage in positional accuracy. This is augmented by high gain resulting from very small beam size and high detector sensitivity. With a beam spot size of 54 $\mu$m and a mechanical arm advantage of about 7 ($L_{translator}$) to 1 ($L_{actuator}$), for example, the position of the magnetic head 16 can be easily controlled to within ±5 microinches. This is a sufficiently precise control to enable approximately 4,000 reference patterns per inch to be written on the disk 14. Greater density in writing reference patterns can be provided by further increasing the mechanical advantage and adjustments in the optical path or by using more a precise translator which could employ laser interferometry, etc.

This capability is achieved without any more than two minor structural additions to the sealed disk drive 10, and by a mechanical and optical mechanism that is entirely external to the sealed disk drive 10. Thus there is no need for the unit to be only partially assembled, hence clean room conditions are not a prerequisite to writing the patterns. The disk drive 10, manufactured by mass production methods, need only be placed on a suitable fixture so that the actuator axis 20 is properly aligned. This arrangement is quite tolerant of the relative positions of the drive. Then with the actuator arm 18 commanded to the home position, the translator 42 is correspondingly placed at a start position. Thereafter, incrementing the translator 42 causes the rotary actuator to be located at the chosen track positions on the disk. At each position, once the actuator arm 18 has stabilized with the magnetic head 16 at the radius defined by the translator 42, the reference patterns can be written using read/write circuits 38.

To fully realize the potential of this concept, however, advantage must be taken of it to correct for certain practical problems concomitant to low cost light beam sources and optical elements. Semiconductor lasers do not typically generate beams of constant uniformity and directionality. The attenuation of beam power as it traverses the optical path may also vary. These factors can adversely affect magnetic head positioning accuracy. Also consideration must be given to possible beam distortion introduced by the window and manufacturing tolerances as to placement of mechanical elements.

Figure 2:
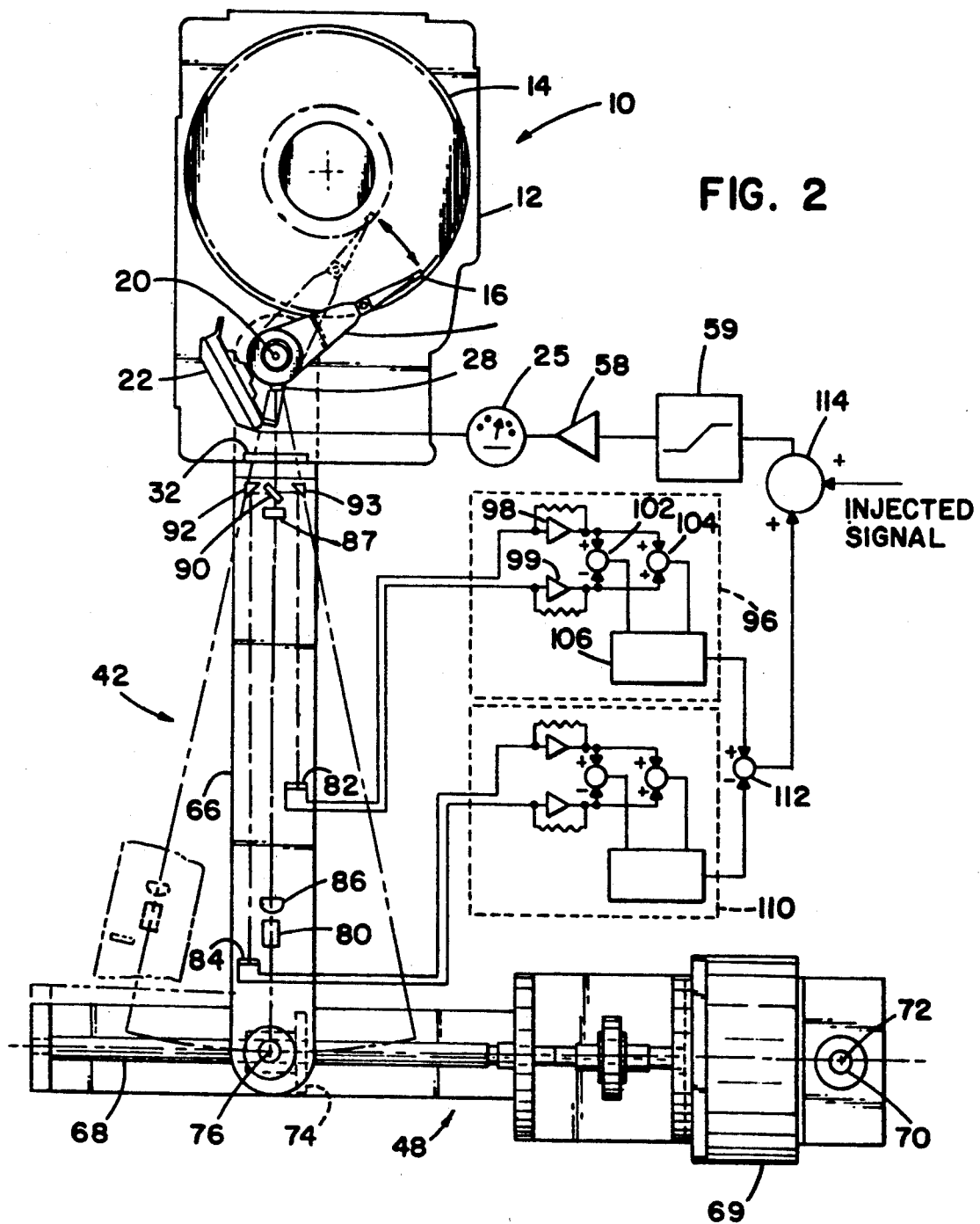
FIG. 2 is a plan view of a more specific example of mechanism, optical path and error signal generating circuits in the arrangement of FIG. 1.
Figure 3:
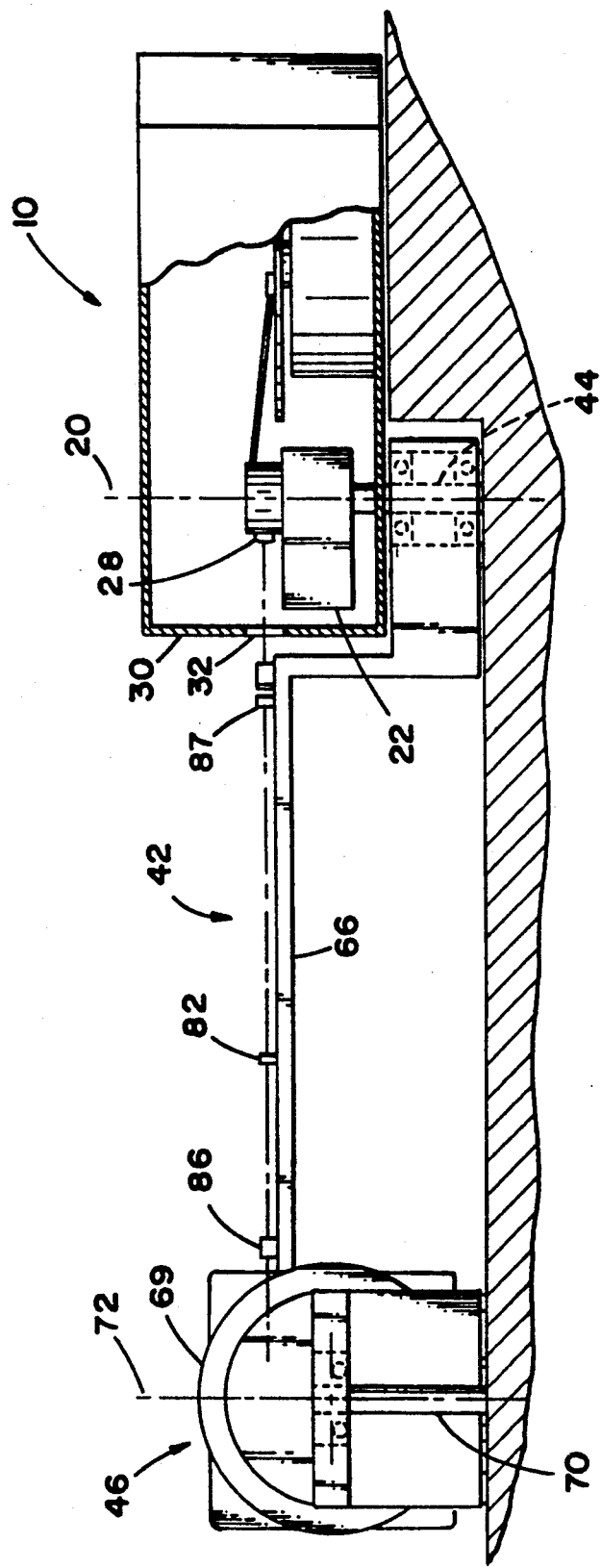
FIG. 3 is a side view of the system of FIG. 2.

The system of FIGS. 2 and 3 is a practical implementation of the configuration of FIG. 1, with extension of the autocollimator technique. The translator 42 comprises an arm 66 mounted to pivot approximately about the actuator axis 20 as in FIG. 1. The structure to which the arm 66 is attached includes reference points or, not shown, surfaces against which the disk drive 10 may be indexed. These references may comprise registration holes or pins built into the bottom or sides of the housing 12 or reference surface, or a combination of such features. These may be used to locate the disk drive relative to the structure to which the translator 42 is attached. The positioner 46 comprises a transverse lead screw drive 68 turned by a microstepper 69 and mounted to pivot on a shaft 70 about a positioner reference axis 72 that is parallel to the actuator axis 20. Variations in the length of increments at the translator 42 may be desirable to assure equal increments of movement at the head 16. However, this variation is dependent on angle in wholly predictable fashion and the increments may thus be adjusted in predetermined fashion by the controller circuits 40. An additional pivot 76 is provided between the lead screw nut 74 driven by the lead screw 68 and the translator arm 66 which accommodates changes in the angular relationship between the translator 42 and the positioner 46 as the translator arm 66 moves arcuately through its range.

In this example the light beam source comprises a semiconductor diode laser 80 pointed toward the mirror 28 on the actuator 18, through the window 32. On each side of the laser beam path, facing in a parallel direction, are separate detectors, consisting of a position feedback detector bicell 82 (hereinafter the feedback bicell) and a beam direction detector bicell 84 (hereinafter the direction bicell). The beam from the laser 80 is passed through a collimating lens 86 and a focusing lens 87, to a beam splitter 90 angled at a 45° angle to the beam path. A portion of the incident beam, a reference beam, is deflected off to a corner reflector 92 into a reverse but parallel path to the direction bicell 84. The remaining portion of the incident beam proceeds through the beam splitter 90 and the window 32 and after reflection off the mirror 28 on the actuator 18, returns to be reflected off the beam splitter 90 to a second corner reflector 93, and then along a second parallel but reverse path to the feedback bicell 82. If there is beam directional instability due to the laser 80 it is present both in the reference beam and the feedback beam and correspondingly varying signals are derived at the feedback bicell 82 and direction bicell 84, to be used as hereafter described.

The two currents from the feedback bicell 82 are applied to an arm position detector circuit 96 within the error signal generating circuits 56. The two currents are separately amplified in first and second transimpedance amplifiers 98, 99 respectively, and their difference is derived at a first difference junction 102, while their sum is derived at a summing junction 104. The difference signal, which represents the basic error signal but which may drift with variations in beam intensity, is thus adjusted to a suitable higher or lower normalized level by a conventional normalizer circuit 106 by using the summed amplitude of the two signals as a reference. Like circuits may be utilized in the beam direction circuit 110, which derives the two outputs from the direction bicell 84, and which then generates a normalized error signal output which is differentially combined at a second difference circuit 112 with the error signal output from the detector circuit 96, and the resultant signal is applied to an amplifier 58 via a compensation circuit 59 performing accepted control system functions.

A number of expedients aid in optimizing the performance of this system. For example, recognizing the elliptical character of the beam from the laser 80, the long dimension of the focused beam spot is parallel to the index line dividing the bicell, by proper orientation of the laser. The divergent light beam from the laser is, after formation into a collimated beam by the first lens 86, focused by the second lens 87 in a region close to the window 32. The shorter the focal length of the focusing lens 87, the smaller the beam size at the feedback bicell 82. In a practical example the laser 80 beam diverges, and the first lens 86 provides a collimated beam of 4.6 mm which is focused by the second lens 87 into the feedback bicell 82 to have a 54 μm diameter in the long dimension. For a 5¼" disk drive unit, a practical example of the length relationships is 3" (76 mm) for the rotary arm distance from pivot axis to magnetic head recording gap, and 8" (203 mm) beam length to the feedback bicell 82 was selected. Under these conditions, a 1 microinch (0.0254 micron) displacement at the head gap is equivalent to a spot motion of 0.12% of the beam diameter, which with amplifier gain provides a significant error signal, hence the system has adequate static performance to achieve accurate positioning. The ideal situation during the pattern writing process is for the actuator to be "locked" in position so as not to have any error contributions from the actuator positioning system present in the written patterns. While it is not practical to "lock" the actuator, an actuator control with a high gain bandwidth product will approximate this condition. The present example provides a position control system with an open loop crossover frequency of well over 500 Hz which provides dynamic performance (i.e., higher bandwidth) much better than alternative methods and achieves the very high desired accuracies. The resulting stiffness is proportionate to the square of the frequency.

This may be better appreciated by reference to FIG. 4, in which the incoming light path from the collimating lens 86 is shown in simplified form, and directed through the focusing lens 87 in the window 32 onto the planar mirror 28. The beam reflected back onto the feedback bicell 82 is controlled at an arm length, $L_{translator}$, which is relatively long with respect to the distance between the actuator axis and the recording head gap, $L_{actuator}$. In this Figure, the incoming beam is shown at an angle relative to the outgoing beam, rather than parallel, solely for purposes of clarity. The focal length and position of the lens 87 are chosen such that the focal plane coincides with the surface of the feedback bicell 82. Because the diffraction limited spot size is smaller with a smaller focal length, the feedback bicell 82 can be placed relatively close to the window 32, but practical consideration limit this spacing. The mechanical advantage is greater with a higher ratio between $L_{translator}/L_{actuator}$, and while 6:1 to 7:1 ratios are used in the present example, different ratios can be used if desired. Analysis of noise factors and system sensitivity, however, establishes that, as desired, a minute variation at the recording gap results in a significant signal (compared to noise) derived at the error signal generating circuits to enable precise actuator control.

Two other factors are possible sources of error, but upon analysis, are seen to be inconsequential. The spherical aberration effect introduced by the window 32 is minimal, but an astigmatism that varies with the angle of incidence of the beam on the window is also introduced. However, this effect introduces defocusing which is an order of magnitude smaller than the beam spot size (54 microns) so that these aberrations are insignificant. Similarly, consideration has been given to the effects of possible misalignment of the translator axis relative to the actuator axis, and differences in placement of the mirror on the rotary actuator. While such errors can have a small influence on beam spot size, and upon the optical path length, there is no effect on the relationship between the optical platform angle and the actuator angle. Consequently, when the optics are initially aligned relative to the home position of the rotary actuator, such errors are automatically cancelled. The maximum allowable pivot plus mirror displacement along the optical axis, and the perpendicular misalignment, are in the low millimeter range, which is well within manufacturing tolerances.

The capability for external control of the internal rotary actuator afforded by the system of FIGS. 1-4 enables other types of data transfer to take place, with or without position information. After assembling a disk drive and before or after the drive is sealed, for example, the system can be used to position the head assembly at different track locations for reading or writing purposes, or both.

FIG. 5 depicts a system that has the basic advantages of the concept, but involves different design tradeoffs. The mirror 28' and window 32' are incorporated in the drive unit 10', as previously described. However, the light source comprises a fixed laser 80', which, together with collimating and focusing lenses (not shown) is disposed to direct a light beam onto the mirror 28', for deflection out to a feedback bicell 82'. The feedback bicell 82' is on a translator 42' moved by a positioner 46', either linearly (with corrections) or in an arc about the actuator axis. Error signal generating circuits, including a compensation circuit 59', and a power amplifier 58', are utilized to energize the actuator drive and to control magnetic head position. The advantages include a simpler optical system and a double angle beam deviation with translator 42' position. The result is that the system has double the beam sensitivity at the cost of a larger window.

As seen in FIG. 6, systems and methods in accordance with the invention may also be utilized in a combination that does not require an internal mirror or adjacent window. The rotary actuator internal to the disk drive 10' has a shaft 130 that extends through a sealed bearing 131 to an end outside the housing 12', so that its mechanical angular position is available outside the housing 12'. The angular position of the shaft 130 is directly indicative of the arm and head positions. Consequently, a mirror 28' may be temporarily attached by a fixture 132, such as a magnetic or threaded element, to the shaft 130 end. The mirror 28' can bisect the central axis of the actuator shaft, or it can be at a radius, but in each instance the plane of the mirror should be parallel to the axis. While the mirror 28' can obviously be adjusted by trial and error, an alignment unit (not shown) may be used to place the mirror 28' at a precise angle when the actuator is in a predetermined position, such as at the "home" stop. Preferably, however, an index slot (not shown) will be incorporated in the shaft 130 transverse to the actuator axis, so as to enable the fixture 132 to seat itself with the mirror 28' at a precise angular orientation. It should be noted that the shaft 130 need not extend flush with the housing wall but can be below it, as long as the mirror 28' can receive the beam. The bearing seal 131 can be assured by a replaceable cover (not shown) which further protects against leakage into the housing interior.

With this arrangement, the disk drive 10' with attached external fixture 132 and mirror 28' on the shaft 130 is seated on a holder so as to be in the path of the focused laser beam from the translator 42' and positioner 46' system. Initialization and incrementing, with writing of position reference information at each position, thus proceeds as previously described. When writing is complete the fixture 132 and mirror 28' are removed from the shaft 130 and the disk drive 10' is ready for data transfer operations.

Figure 7A:
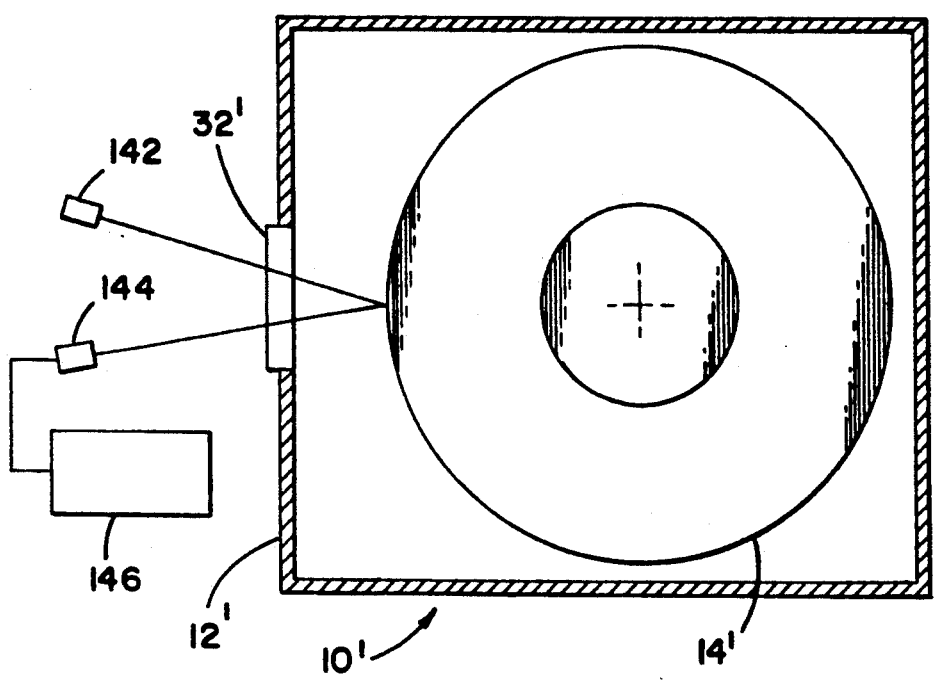
FIG. 7 is a view of a different arrangement, showing how angular position of a rotating member within a sealed housing may be remotely detected.
Figure 7B:
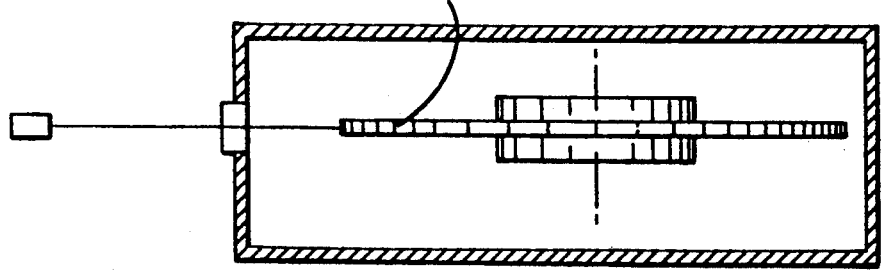

A feature of the invention is that the capability for externally sensing an internal position can be used in other modes as well. As seen in FIG. 7, a disk 14' in a sealed disk drive 10' may be manufactured with precisely scribed index marks 140 on its periphery. A window 32' in the housing wall 12' is in line with the periphery, so that a beam from a fixed laser 142 passes through the window 32' to be reflected back out to a detector cell 144. With a number of approximately equally spaced index marks 140, the cell 144 generates a train of pulses at a given periodicity. These are applied to processor circuits 146 which then generate timing, clocking or velocity control signals as desired. In accordance with known techniques, for example, a high frequency train of clock signals is synchronized to the index pulses. The system therefore provides an accurate means of identifying the instantaneous angular position of the disk.

This concludes the description of the preferred embodiment of the present invention. The following paragraphs describe some of the uses of the present invention. The present invention is particularly suited to analyzing the performance of the disk drives 10.

Using the optical positioning method of the present invention, various attributes of the head 16 and disk 14 assembly can be measured. Some of these attributes may be measured without the need for servo tracks, for example, on a newly manufactured head 16 and disk 14 assembly where the servo tracks have yet to be written. Also, the quality of the servo tracks may be measured using the present invention.

In preparatory testing of a newly assembled disk drive (either in a completely or partially assembled state) 10, it may be desirable to analyze the quality of the write/read signals and the media consistency without the need or use of servo tracks. One of the attributes of the disk drive 10 that may be measured is the magnetic head 16 and disk 14 performance at certain positions on the disk 14. For example, the head 16 may be positioned at the inner disk 14 radius using the positioning system of the present invention and then a track of data written. This track can be read and the quality of the read signal examined with regard to various properties such as amplitude, modulation, pulse width, etc. These tests could be performed at several different track locations so that the behavior of the head 16 and disk 14 can be determined. Without a full operating system and servo information, this cannot readily be accomplished, if at all, by present techniques.

One measurement may be the "off-track" performance of the head 16 on a specific track. Referring to FIG. 1, the control circuits 40 may provide a "home" command to the actuator drive circuits 36 for initializing operations, and "increment" commands thereafter for selecting successively spaced apart data tracks on disk 14. The positioning system places the head 16 at a predetermined radius on disk 14 and a data track is written by read/write circuit 38 in conjunction with head 16. Subsequently, control circuits 40 can incrementally advance head 16 a radial distance along disk 14 so that the head 16 is moved off-track and away from the written track. Usually, the incremental distance moved is smaller than the radial gap separating adjacent concentric tracks. Such fine position increments from the written track allows observation of read/write track performance to ascertain error tolerances in positioning the head 16. The amplitude of the head 16 signal is measured so that read/write performance as a function of off-track position error can be measured. For example, measuring apparatus 25, coupled to read/write circuits 38 and having more than one measurement channel, can measure the amplitude, modulation, and pulse width of the head 16 signal.

Another measurement may be of the "cross-track" performance of a head 16 on several tracks. Control circuits 40 and actuator drive circuits 36 can position head 16 so as to write a first and a second concentric data track at a prescribed distance apart. Subsequently, control circuits 40 can position the head 16 at the center of the first track and then move the head 16 off center.

The control circuits 40 would advance the head 16 a radial distance along disk 14 away from the first track and toward the second track, in increments preferably smaller than the standard prescribed radial gap separating the two concentric tracks of data. Such fine increments in position allows observation of the head 16 signals to determine at what points signals from the second track interfere with signals from the first track. In this manner, read/write performance as a function of cross-track interference can be measured. For example, measuring apparatus 25, coupled to read/write circuits 38 and having more than one measurement channel, can measure the amplitude, modulation, and pulse width of the head 16 signals.

Still another measurement may be of the quality of the written servo tracks or embedded servo information, as well as the quality of the signal derived from the servo information. For example, the position error signals are signals derived the relative position of the read/write head and the written servo tracks. The signals are directly proportional to the relative position between the head 16 and the previously written servo tracks. The positioning system of the present invention may be used to ascertain the quality of the written servo tracks by examining the resultant position error signal either in the track following mode or as the head is moved across the written servo information in several tracks. The positioning system could continuously scan the actuator arm 18 across the tracks or position the arm 18 in incremental steps and measure when the arm 18 is stopped.

Yet still another measurement may be of the torque bias created by the actuator cable 23. In small disk drives 10, the electrical connections for the head 16 connection and the actuator 22 connection must be brought from a rotary arm 18 to the stationary housing 12. This is usually accomplished by using a flat flexible cable 23 connecting the actuator 22 electronics to the housing 12. Typically, the flexible cable 23 has some stiffness or resistance to bending and, therefore, imparts a force or torque bias onto the actuator arm 18. This torque bias takes the form of an undesirable torsional resistance to pivotal movement of the arm 18 about axis 20. The value of this torque or cable bias usually varies with the position of the actuator arm 18. For example, as actuator arm 18 pivots, the amount of bias caused by cable 23 varies due to its coiling and uncoiling as head 16 is displaced from an innermost radius to an outermost radius on disk 14. The bias reflects as an injected disturbance and may cause an unacceptable error in system performance depending upon the gain of the closed loop servo. For example, the able bias may effect the accuracy of the on-track positioning of the head 16. It is known that measurement of this bias is advantageous as a quality inspection technique to insure that the bias falls within an acceptable range. Actuator arm 18 can be displaced to different radii on disk 14 at a uniform speed or in incremental positions while the current to drive actuator 22 is monitored by measuring apparatus 25, depicted as an oscilloscope 25 in FIG. 1 or depicted as a current meter 25 in FIG. 2. The positioning system bandwidth is high enough so that the speed is uniform and the torque is proportionate to the actuator motor current. If the value of the torque constant of actuator 22 is known, i.e., the relationship between torque of the actuator 22 vs. current to the actuator 22, and the current to the actuator 22 is measured at various positions, then the torque bias contributed by cable 23 may be calculated by subtracting off the nominal current required to keep actuator arm 18 in position from the measured current at the various radii and multiplying the resultant current value by the known torque constant of actuator 22. Since the torque constant of actuator 22 is typically temperature sensitive, the measurement process may be made over the required temperature range for disk drive 10 to insure acceptable bias torque values.

Figure 8:
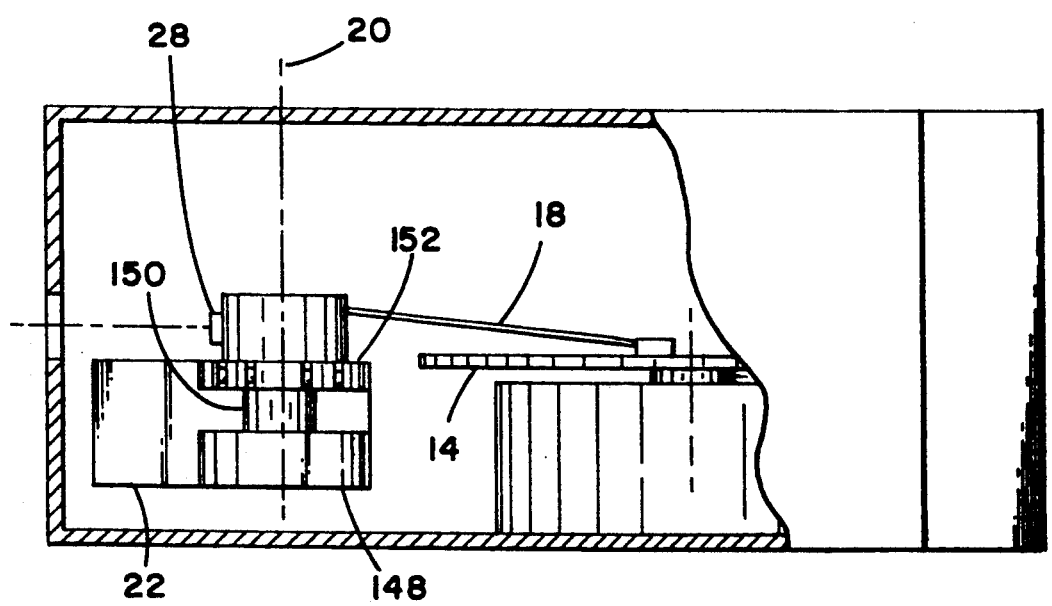
FIG. 8 is a side view showing the ball bearings in the actuator.

Yet still another measurement may be of the ball bearing friction in the actuator 22 pivot supporting the arm 18. Referring now to FIG. 8, the arm 18 is usually connected to a motor 148 via shaft 150 which is supported by a set of ball bearings 152 and rotatable thereabout exhibiting a small amount of friction. The ball bearing 152 friction can also be measured with the positioning system of the present invention. If the actuator 22 is commanded to move a small distance at a constant rate (provided by the high bandwidth), then the arm 18 moves through a small arc and the cable 23 bias torque remains relatively constant and the inertial forces are zero. The ball bearing 152 friction can be determined from the measured change in the current of the actuator 22 and with the actuator's 22 torque constant, which is proportional to the ball bearing 152 friction. The current deviation may be recorded over the temperature operating range to insure proper operation.

Yet still another measurement may be of the torque constant of the actuator 22, which can be measured at various actuator 22 positions. Referring now to FIG. 2, the optical detector 52 has a small range of displacement that is quite linear. If the actuator 22 is at a specific location, a small signal may be injected into a summing junction 114 of the closed loop servo. The actuator arm 18 will then oscillate about the nominal location. The amplitude of these oscillations can be measured with the optical detector 52. The current to the actuator 22 can also be measured. From the oscillation amplitude, actuator 22 current and frequency, the ratio of torque constant to actuator 22 inertia can be calculated. Once the actuator 22 inertia is determined, then the actuator 22 torque constant can be determined.

While there have been described above and illustrated in the drawings various forms and alternatives in accordance with the invention, it will be appreciated that the invention is not limited thereto but encompasses all modifications in accordance with the scope of the appended claims.

What is claimed is:

1. A system for measuring attributes of a rotatable data storage unit using the head assembly on a controllable actuator, comprising:

(a) means, disposed spaced apart from the actuator and internal to the storage unit, for reflecting a light beam of small cross section, generated externally to the storage unit, off a surface responsive to actuator position through a transparent window in the storage unit onto an image region along a path disposed at a distance from the actuator;

(b) means for generating a control signal in response to the position of the light beam along the path;

(c) means for adjusting the actuator position in response to the control signal to maintain the actuator at a predetermined relation to the selected image region while data transfer is effected by the head assembly; and (d) means for measuring characteristics of the data transfer effected by the head assembly so that diagnostic indications of the data storage unit can be provided.

2. The system as set forth in claim 1 above, wherein the means for measuring comprises means for performing a qualitative analysis of at least one of an attribute of amplitude, modulation, and pulse width of the data transfer effected by the head assembly.

3. A system as set forth in claim 2 above, wherein:
(i) the means for adjusting further comprises means for positioning the actuator at a plurality of locations on the rotatable data storage unit from an innermost to an outermost radii thereof; and
(ii) the means for measuring further comprises means for comparing at least one of an attribute of amplitude, modulation, and pulse width from the plurality of locations on the rotatable data storage unit.

4. A system as set forth in claim 1 above, wherein the means for adjusting comprises means for off-track positioning of the actuator in increments smaller than a standard radial gap between concentric tracks on the rotatable data storage unit, so that the means for measuring can determine amplitude information of the data transfer thereat.

5. A system as set forth in claim 4 above, further comprising means for generating comparisons of data transfer amplitude as a function of the increments.

6. A system as set forth in claim 1 above, wherein the means for adjusting comprises for means for cross-track positioning of the actuator in increments smaller than a standard radial gap between concentric tracks on the rotatable data storage unit, so that the means for measuring can determine amplitude information of the data transfer thereat.

7. A system as set forth in claim 6 above, further comprising means for generating comparisons of data transfer amplitude as a function of the increments.

8. A system as set forth in claim 1 above, wherein the means for adjusting comprises means for adjusting the actuator position to effect data transfer at one or more locations between first and second data tracks recorded on the rotatable data storage unit, wherein the locations are spaced apart in increments smaller than a predetermined radial distance between the first and second data tracks, so that the means for measuring can provide information regarding interference between the first and second tracks.

9. A system as set forth in claim 1 above, wherein the means for adjusting comprises means for adjusting the actuator position to effect data transfer at one or more locations increasingly away from a data track recorded on the rotatable data storage unit, so that the means for measuring can provide information regarding data transfer amplitude as a function of distance from an on-track position.

10. A system as set forth in claim 1 above, wherein the means for adjusting comprises means for adjusting the actuator position to effect data transfer at one or more locations from an innermost radius to an outermost radius of the rotatable data storage unit while the head assembly effects data transfer of previously written data as embedded servo information, so that the means for measuring can provide information regarding control signal values corresponding to the light beam angle as a function of actuator position.

11. A system for measuring attributes of a rotatable data storage unit using the head assembly on a controllable actuator, comprising:
(a) means, disposed spaced apart from the actuator and internal to the storage unit, for reflecting a light beam of small cross section, generated externally to the storage unit, off a surface responsive to actuator position through a transparent window in the storage unit onto an external image region along a path disposed at a distance from the actuator;
(b) means for generating a control signal in response to the position of the light beam along the path;
(c) means for adjusting the actuator position in response to the control signal to maintain the actuator at a predetermined relation to the selected image region; and
(d) means for measuring characteristics of the actuator during adjustment of its position so that diagnostic indications of the data storage unit can be provided.

12. A system as set forth in claim 11 above, wherein a cable attaches the actuator to a stationary support, and the means for measuring comprises means for monitoring current to the actuator when it is positioned at various locations on the rotatable data storage unit, so that a torque bias for the cable can be calculated by subtracting a nominal current required to keep the actuator in position from the measured current at the various locations and multiplying a result therefrom by a known torque constant of the actuator.

13. A system as set forth in claim 11 above, wherein ball bearings support the actuator, and the means for measuring comprises means for monitoring current to the actuator as the actuator moves a small distance at a constant rate, wherein a measured change in the current to the actuator is proportional to the ball bearing friction.

14. A system as set forth in claim 11 above, further comprising means for injecting a signal into a summing junction of the closed loop servo when the actuator is at a specific location, so that the actuator oscillates about the specific location, and wherein the means for measuring comprises means for determining the oscillation amplitude using the optical detector and the current to the actuator, so that the ratio of torque constant to inertia can be calculated for the actuator.

* * * * *

UNITED STATES PATENT AND TRADEMARK OFFICE
CERTIFICATE OF CORRECTION

PATENT NO. : 5,319,509

DATED : June 7, 1994

INVENTOR(S) : Gajus Michelson, et al.

It is certified that error appears in the above-identified patent and that said Letters Patent is hereby corrected as shown below:

Column 1, line 9, after "Pat. No. 5,268,801" insert --Dec. 7, 1993--.

Signed and Sealed this

Third Day of January, 1995

Attest:

BRUCE LEHMAN

*Attesting Officer*  *Commissioner of Patents and Trademarks*